US010575279B2

(12) United States Patent
Asuri et al.

(10) Patent No.: US 10,575,279 B2
(45) Date of Patent: Feb. 25, 2020

(54) METHODS AND APPARATUS FOR A TRANSMIT PATH WITH FREQUENCY HOPPING PHASE LOCKED LOOP (71) Applicant: QUALCOMM Incorporated, San Diego, CA (US)

(72) Inventors: Bhushan Shanti Asuri, San Diego, CA (US); Jingcheng Zhuang, San Diego, CA (US); Praveen Sampath, San Diego, CA (US); Shrenik Patel, San Diego, CA (US); Jeremy Darren Dunworth, La Jolla, CA (US); Lai Kan Leung, San Marcos, CA (US); Gurkanwal Singh Sahota, San Diego, CA (US); Jong Min Park, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 425 days.

(21) Appl. No.: 15/088,725

(22) Filed: Apr. 1, 2016

(65) Prior Publication Data
US 2017/0094641 A1 Mar. 30, 2017

Related U.S. Application Data (60) Provisional application No. 62/233,180, filed on Sep. 25, 2015.

(51) Int. Cl.
H04W 72/04 (2009.01)
H04L 5/00 (2006.01)
(Continued)

(52) U.S. Cl.
CPC ............ H04W 72/04 (2013.01); H04B 1/713 (2013.01); H04L 5/0044 (2013.01);
(Continued)

(58) Field of Classification Search
CPC ...... H04B 1/713; H04B 1/7136; H04W 72/04
(Continued)

(56) References Cited

U.S. PATENT DOCUMENTS 5,224,121 A   6/1993  Schorman
8,934,504 B2  1/2015  Schwartz et al.
(Continued)

FOREIGN PATENT DOCUMENTS

CN       2773988 Y    4/2006
CN     101079628 A   11/2007
(Continued)

OTHER PUBLICATIONS

Passas V., et al., "Towards the Efficient Performance of LTE-A Systems: Implementing a Cell Planning Framework based on Cognitive Sensing," 1st International Workshop on Cognitive Cellular Systems (CCS), 2014, pp. 1-5.
(Continued)

Primary Examiner — Kevin M Burd
(74) Attorney, Agent, or Firm — Procopio, Cory, Hargreaves & Savitch LLP (57) ABSTRACT An apparatus comprising a transmit path, a plurality of local oscillators and a control unit. The control unit may be configured to: receive an upcoming resource block (RB) allocation; determine whether the upcoming RB allocation is the same as the current RB allocation; in response to determining that the upcoming RB allocation is different than the current RB allocation: select an unused LO of the plurality of LOs; determine whether a number of allocated RBs associated with the upcoming RB allocation is greater than a threshold; and in response to determining that the number of allocated RBs associated with the upcoming RB
(Continued)

allocation is not greater than the threshold, tune the selected LO to a frequency corresponding to the upcoming RB allocation.

18 Claims, 5 Drawing Sheets

(51) Int. Cl.
*H04B 1/713* (2011.01)
*H04B 1/7136* (2011.01)

(52) U.S. Cl.
CPC .. *H04L 5/0094* (2013.01); *H04B 2001/71362* (2013.01); *H04L 5/0053* (2013.01)

(58) Field of Classification Search
USPC ........................................ 375/130, 132, 135
See application file for complete search history.

(56) References Cited

U.S. PATENT DOCUMENTS

| | | | |
|---|---|---|---|
| 8,948,154 B2 | 2/2015 | Gaal et al. | |
| 2010/0091641 A1* | 4/2010 | Gaal | H04B 7/068 370/208 |
| 2012/0262238 A1* | 10/2012 | Dong | H03B 5/1228 331/2 |
| 2013/0039368 A1* | 2/2013 | Schwartz | H04L 5/0007 370/480 |
| 2013/0262238 A1 | 10/2013 | Liubachev | |
| 2014/0314175 A1* | 10/2014 | Nilsson | H04B 1/0475 375/295 |
| 2015/0078483 A1 | 3/2015 | Sun et al. | |
| 2015/0146640 A1 | 5/2015 | Baldemair et al. | |

FOREIGN PATENT DOCUMENTS

| | | |
|---|---|---|
| CN | 101384065 A | 3/2009 |
| EP | 2592758 B1 | 6/2014 |
| KR | 20000060430 A | 10/2000 |
| WO | WO-2011100479 A1 | 8/2011 |
| WO | 2014003612 A1 | 1/2014 |
| WO | WO-2014131543 A1 | 9/2014 |

OTHER PUBLICATIONS

International Search Report and Written Opinion—PCT/US2016/048581—ISA/EPO—dated Nov. 16, 2016.

\* cited by examiner

METHODS AND APPARATUS FOR A TRANSMIT PATH WITH FREQUENCY HOPPING PHASE LOCKED LOOP

CROSS-REFERENCE TO RELATED APPLICATIONS

The present application is related to commonly owned Provisional Patent Application No. 62/233,180, filed on Sep. 25, 2015, and entitled "Transmit Path with Frequency Hopping Phase Locked Loop," which is incorporated herein by reference.

BACKGROUND

Technical Field

The present disclosure relates generally to wireless communication systems, and more specifically to techniques for reducing spurious signal emissions.

Related Art

In a Long Term Evolution (LTE) communication network, uplink radio resources may be allocated dynamically to user equipment (UE) based on different application, data rates, and quality of service (QoS) requirements. Specifically, a UE in an LTE communication network may be allocated varying numbers of resource blocks (RBs) for uplink transmissions from the UE. Each RB may extend over one slot period (e.g., 0.5 milliseconds (ms)) in the time domain while occupying a certain range (e.g., 180 kilohertz (kHz)) in the frequency domain. The RB allocation for a UE may vary in both bandwidth and frequency range between consecutive LTE sub-frames (i.e., two 0.5 ms slot periods). Based on the RB allocation, the UE may transmit data at the center frequency of the allocated RBs.

A conventional transmit path may include a frequency mixer that modulates a carrier signal from a local oscillator (LO) with a modulating signal from a baseband filter (BBF) representing the data to be transmitted. The carrier signal may have a fixed frequency that is relatively high. By contrast, the frequency of the modulating signal may be at the baseband (i.e., near zero hertz). Moreover, the frequency of the modulating signal may be varied in order to achieve an output signal at the center frequency of the allocated RBs. Up-converting the modulating signal from the baseband to the frequency of the carrier signal may give rise to spurious signal emissions including for example, but not limited to, residual sideband (RSB) signals and intermodulation (IM) products (e.g., primary and second 4FMOD signals).

In particular, when RB allocation is narrow (e.g., one RB), the operation of a conventional transmit path may generate SEMs that fall outside of the frequency band allocated to a UE and interfere with transmissions on other channels. A UE may adopt additional maximum power reduction (AMPR) parameters in order to suppress spurious signal emissions to conform to $3^{rd}$ Generation Partnership Project (3GPP) LTE specifications. However, adoption of AMPR parameters may reduce the output power of the UE and thus limit the UE's coverage area.

SUMMARY

Apparatuses and methods for frequency hopping uplink transmission are provided.

According to various embodiments, there is provided an apparatus for frequency hopping uplink transmission. The apparatus may include a transmit path, a plurality of local oscillators (LOs), and a control unit.

The control unit may be configured to: receive an upcoming resource block (RB) allocation; determine whether the upcoming RB allocation is the same as a current RB allocation; and in response to determining that the upcoming RB allocation is different than the current RB allocation: select an unused LO of the plurality of LOs; determine whether a number of allocated RBs associated with the upcoming RB allocation is greater than a threshold; and in response to determining that the number of allocated RBs associated with the upcoming RB allocation is not greater than the threshold, tune the selected LO to a frequency corresponding to the upcoming RB allocation.

According to the various embodiments, there is provided a method for frequency hopping uplink transmission. The method may include: receiving an upcoming RB allocation; determining whether the upcoming RB allocation is the same as a current RB allocation; and in response to determining that the upcoming RB allocation is different than the current RB allocation: selecting an unused LO of a plurality of LOs; determining whether a number of allocated RBs associated with the upcoming RB allocation is greater than a threshold; and in response to determining that the number of allocated RBs associated with the upcoming RB allocation is not greater than the threshold, tuning the selected LO to a frequency corresponding to the upcoming RB allocation.

According to the various embodiments, there is provided an apparatus for frequency hopping uplink transmission. The apparatus may include: means for providing an output signal from a plurality of LOs; and control means for receiving an upcoming RB allocation and determining whether the upcoming RB allocation is the same as the current RB allocation, the control means in response to determining that the upcoming RB allocation is different than the current RB allocation: selects an unused LO of the plurality of LOs; determines whether a number of allocated RBs associated with the upcoming RB allocation is greater than a threshold; and in response to determining that the number of allocated RBs associated with the upcoming RB allocation is not greater than the threshold, tunes the selected LO to a frequency corresponding to the upcoming RB allocation.

According to various embodiments, there is provided a computer program product for frequency hopping uplink transmission. The computer program product may include non-transitory computer readable medium having stored thereon instructions for causing one or more processors to perform operations comprising: receiving an upcoming RB allocation; determining whether the upcoming RB allocation is the same as a current RB allocation; and in response to determining that the upcoming RB allocation is different than the current RB allocation: selecting an unused LO of a plurality of LOs not currently in use; determining whether a number of allocated RBs associated with the upcoming RB allocation is greater than a threshold; and in response to determining that the number of allocated RBs associated with the upcoming RB allocation is not greater than the threshold, tuning the selected LO to a frequency corresponding to the upcoming RB allocation.

Other features and advantages of the present disclosure should be apparent from the following description which illustrates by way of example aspects of the present disclosure.

BRIEF DESCRIPTION OF THE DRAWINGS

Aspects and features of the present disclosure will be more apparent by describing example embodiments with reference to the accompanying drawings, in which.

DETAILED DESCRIPTION

While a number of embodiments are described herein, these embodiments are presented by way of example only, and are not intended to limit the scope of protection. The apparatuses and methods described herein may be embodied in a variety of other forms. Furthermore, various omissions, substitutions, and changes in the form of the example apparatuses and methods described herein may be made without departing from the scope of protection.

Figure 1:
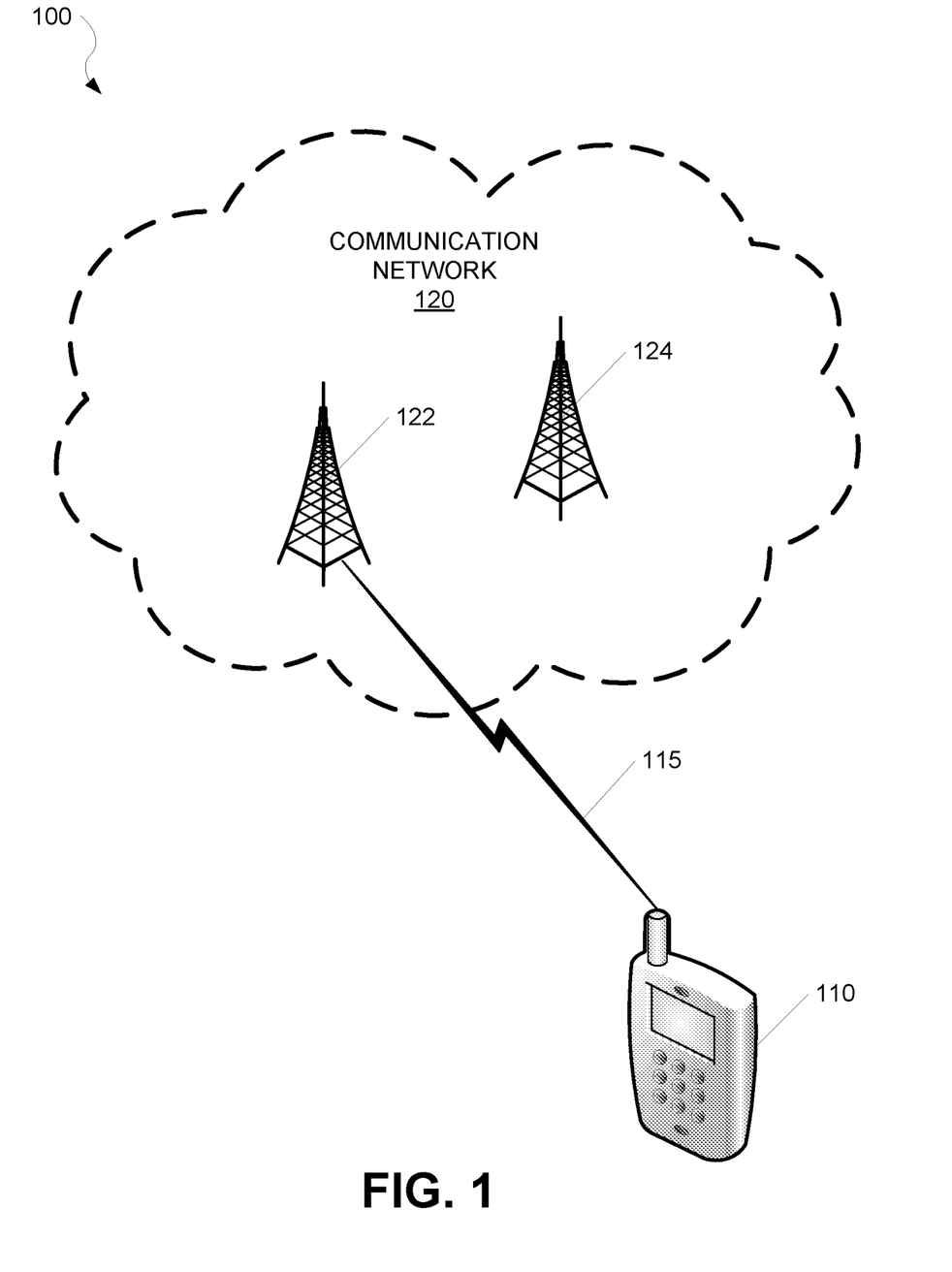
FIG. 1 is a system diagram illustrating a network environment according to various embodiments.

FIG. 1 is a system diagram illustrating a network environment 100 according to various embodiments. Referring to FIG. 1, a communication network 120 may include one or more Evolved Universal Mobile Telecommunications System (UMTS) Terrestrial Radio Access (E-UTRA) Node Bs (eNodeBs) including, for example, but not limited to, a first eNodeB 122 and a second eNodeB 124. The communication network 120 may be, for example, but not limited to, a wireless or mobile communication network.

The communication network 120 may be an LTE communication network. However, a person having ordinary skill in the art can appreciate that the communication network 120 may support different and/or additional radio access technologies (RATs), including, for example, but not limited to, Wideband Code Division Multiple Access (WCDMA), Global System for Mobile communications (GSM), and Time Division-Synchronous Code Division Multiple Access (TD-SCDMA) without departing from the scope of the present disclosure.

A mobile communication device 110 may communicate with the communication network 120 on a subscription 115 via the first eNodeB 122. For example, the mobile communication device 110 may transmit data to and receive data from the communication network 120 via the first eNodeB 122. A person having ordinary skill in the art can appreciate that the mobile communication device 110 may communicate with the communication network 120 on the subscription 115 via a different eNodeB (e.g., the second eNodeB 124) without departing from the scope of the present disclosure. Moreover, a person having ordinary skill in the art can appreciate that the mobile communication device 110 may communicate with different and/or additional communication networks on the subscription 115 and/or a different subscription without departing from the scope of the present disclosure.

Figure 2:
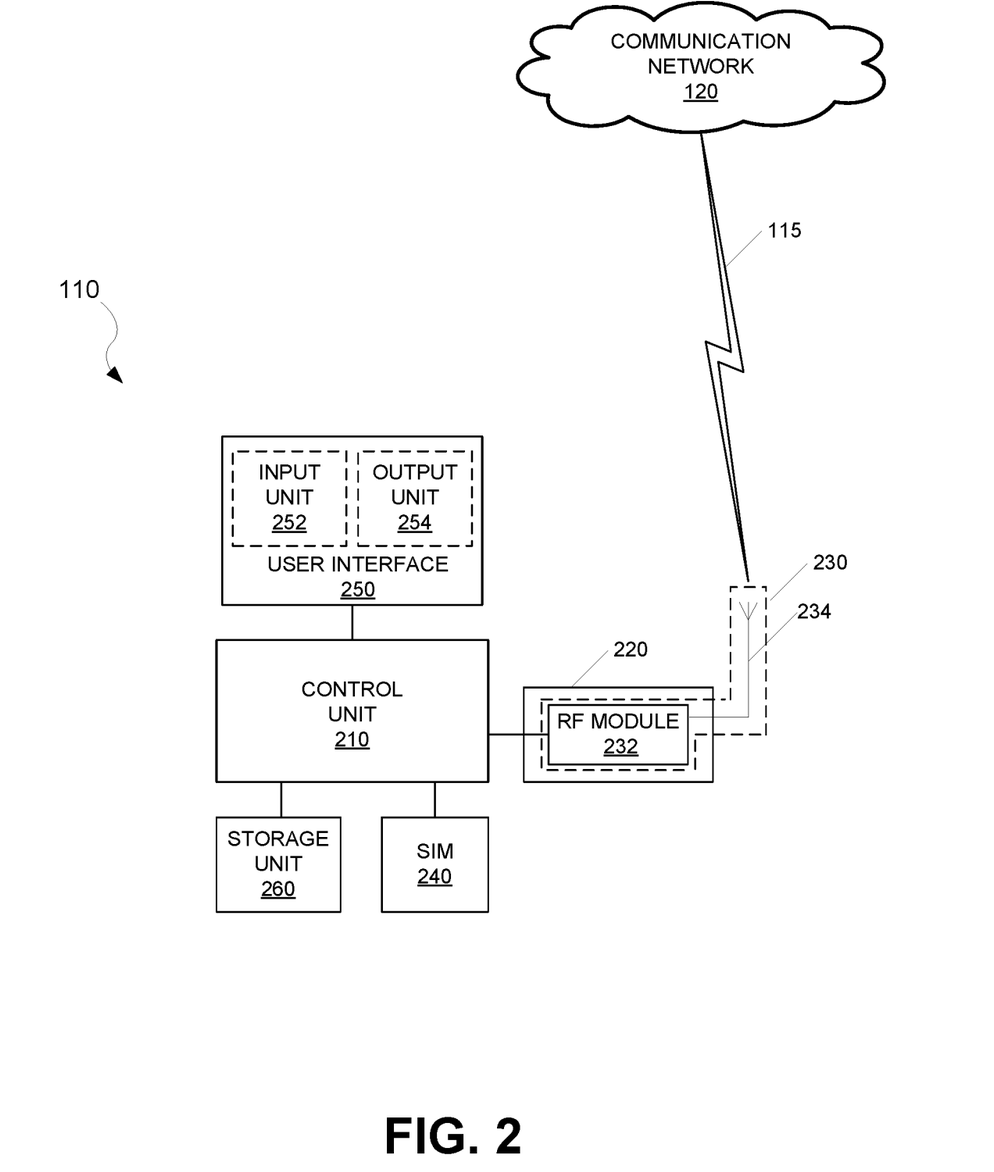
FIG. 2 is a block diagram illustrating a mobile communication device according to various embodiments.

FIG. 2 is a block diagram illustrating a mobile communication device 110 according to various embodiments. Referring to FIGS. 1 and 2, the mobile communication device 110 may include a control unit 210, a communication unit 220, a subscriber identity module (SIM) 240, a user interface 250, and a storage unit 260.

The mobile communication device 110 may be any device capable of wirelessly communicating with one or more communication networks including, for example, but not limited to, the communication network 120. The mobile communication device 110 may be, for example, but not limited to, a smartphone, a tablet PC, or a laptop computer.

The SIM 240 may associate the communication unit 220 with the subscription 115 on the communication network 120. Although the mobile communication device 110 is shown to include a single SIM (e.g., the SIM 240), a person having ordinary skill in the art can appreciate that the mobile communication device 110 may include additional SIMs without departing from the scope of the present disclosure. The additional SIMs may associate the communication unit 220 with a different subscription on the communication network 120 or a different communication network.

The SIM 240 may be a Universal Integrated Circuit Card (UICC) that is configured with SIM and/or universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA subscriber identity module (CSIM) on a card. A SIM card may have a central processing unit (CPU), read-only memory (ROM), random-access memory (RAM), electrically erasable programmable read-only memory (EEPROM) and input/output (I/O) circuits. An Integrated Circuit Card Identity (ICCID) SIM serial number may be printed on the SIM card for identification. However, a SIM may be implemented within a portion of memory of the mobile communication device 110, and thus need not be a separate or removable circuit, chip, or card.

The SIM 240 may store user account information, an international mobile subscriber identity (IMSI), a set of SIM application toolkit (SAT) commands, and other network provisioning information, as well as provide storage space for phone book database of the user's contacts. As part of the network provisioning information, the SIM 240 may store home identifiers (e.g., a System Identification Number (SID)/Network Identification Number (NID) pair, a home public land mobile network (HPLMN) code, etc.) to indicate the SIM card network operator provider.

The communication unit 220 may include an RF chain 230. The RF chain 230 may include, for example, but not limited to, an RF module 232 and an antenna 234. Although the mobile communication device 110 is shown to include a single communication unit (e.g., the communication unit 220), a person having ordinary skill in the art can appreciate that the mobile communication device 110 may include additional communication units without departing from the scope of the present disclosure.

The user interface 250 may include an input unit 252. The input unit 252 may be, for example, but not limited to, a keyboard or a touch panel. The user interface 250 may further include an output unit 254. The output unit 254 may be, for example, but not limited to, a liquid crystal display (LCD) or a light emitting diode (LED) display. A person having ordinary skill in the art will appreciate that other types or forms of input and output units may be used without departing from the scope of the present disclosure.

The control unit 210 may be configured to control the overall operation of the mobile communication device 110 including controlling the functions of the communication unit 220 including, for example, but not limited to, frequency synthesis performed by the RF module 232. The control unit 210 may be, for example, but not limited to, a microprocessor (e.g., general-purpose processor, baseband modem processor, etc.) or a microcontroller.

The storage unit 260 may be configured to store application programs, application data, and user data. At least some of the application programs stored at the storage unit 260 may be executed by the control unit 210 for the operation of the mobile communication device 110.

Figure 3A:
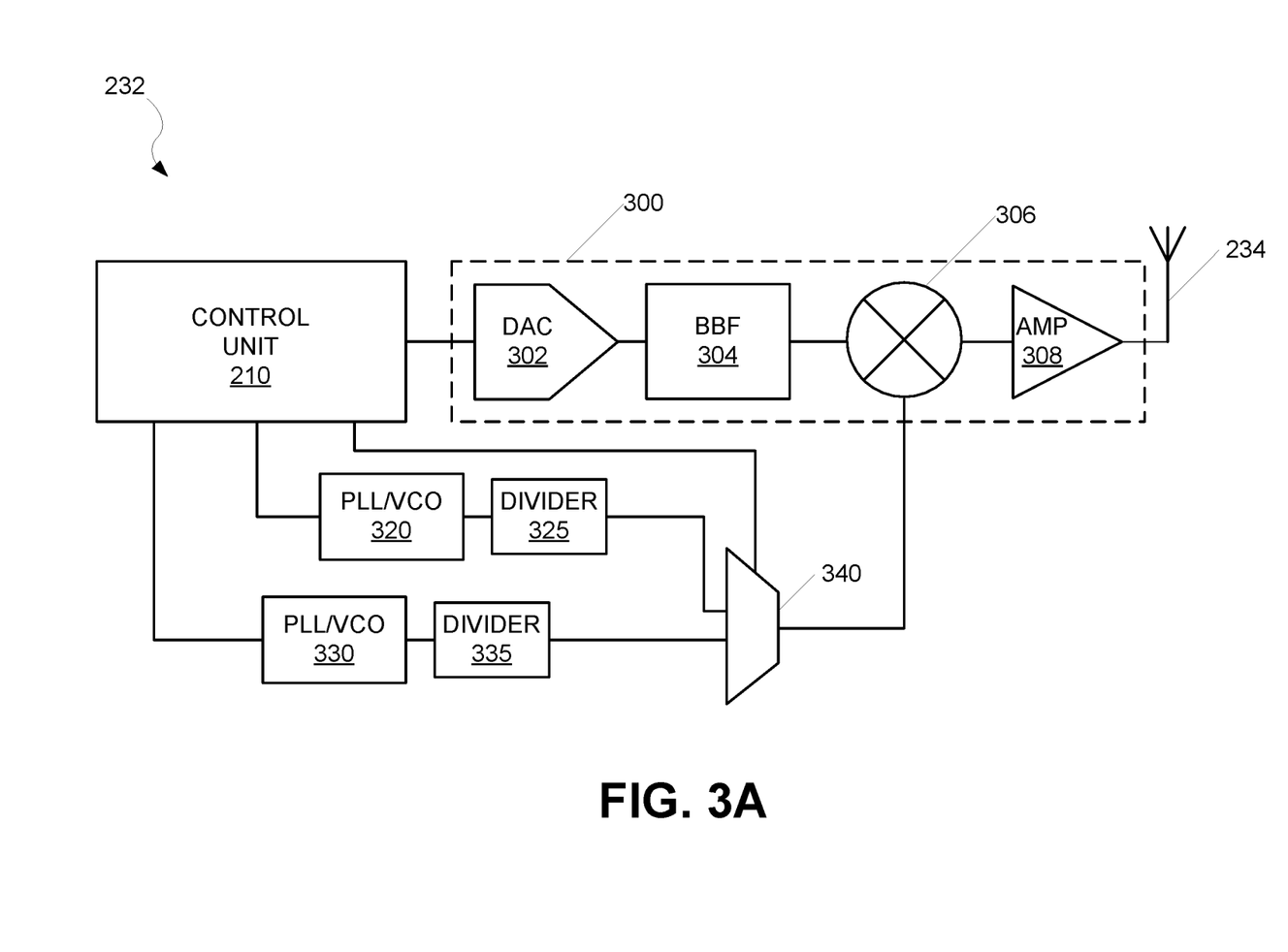
FIG. 3A is a block diagram illustrating a radio frequency (RF) module according to some embodiments.

FIG. 3A is a block diagram illustrating the RF module 232 according to some embodiments. Referring to FIGS. 1, 2, and 3A, the RF module 232 may include a transmit path 300 and a PLL selector 340.

The RF module 232 may further include a plurality of local oscillators (LO). The plurality of oscillators may comprise a plurality of phase locked loops (PLLs) with corresponding voltage controlled oscillators (VCOs) (PLL/VCOs) including, for example, but not limited to, a first PLL/VCO 320 and a second PLL/VCO 330. According to one exemplary embodiment, the RF module 232 may include two PLL/VCOs (e.g., the first PLL/VCO 320 and the second PLL/VCO 330).

The first PLL/VCO 320 may be coupled with a first divider 325. The first PLL/VCO 320 may receive a reference signal having a reference frequency $F_{ref}$ from the control unit 210 and output a signal to the first divider 325. The combination of the first PLL/VCO 320 and the first divider 325 may be configured to generate and output a frequency divided signal that is synchronized to the phase and the frequency (i.e., $F_{ref}$) of the reference signal.

The second PLL/VCO 330 may be coupled with a second divider 335. The second PLL/VCO 330 may receive a reference signal having a reference frequency $F_{ref}$ from the control unit 210 and output a signal to the second divider 325. The combination of the second PLL/VCO 330 and the second divider 335 may be configured to generate and output a signal that is synchronized to the phase and the frequency (i.e., $F_{ref}$) of the reference signal.

In one implementation, an output signal from a PLL/VCO may be an undivided output signal, thus allowing for the omission of dividers.

The mobile communication device 110 may be transmitting data to the communication network 120 via the transmit path 300 according to a current RB allocation. The control unit 210 may receive from the communication network 120 an upcoming RB allocation for the mobile communication device 110. For example, the control unit 210 may be notified of the upcoming RB allocation on the physical downlink control channel (PDCCH) in advance (e.g., 4-8 slot periods).

The upcoming RB allocation may be different from a current RB allocation. For example, the upcoming RB allocation may have a different bandwidth and/or frequency range than the current RB allocation. A single RB may have a bandwidth of about 180 kHz, but other bandwidths may be used.

In one embodiment, in order for the mobile communication device 110 to transmit data according to the upcoming RB allocation, the control unit 210 may select one of the first PLL/VCO 320 and the second PLL/VCO 330 that is not currently in use. The control unit 210 may tune the selected one of the first PLL/VCO 320 and the second PLL/VCO 330 to a target frequency based on a bandwidth of the upcoming RB allocation (i.e., number of allocated RBs).

For example, if the bandwidth of the upcoming RB allocation is narrow (i.e., number of allocated RBs less than or equal to a threshold x, where x may be equal to 6 or another integer value), the control unit 210 may tune the selected one of the first PLL/VCO 320 and the second PLL/VCO 330 to a frequency corresponding to the allocated RBs (e.g., center frequency of the allocated RBs).

In one exemplary embodiment, the control unit 210 may determine the frequency corresponding to the upcoming RB allocation based on a lookup table (LUT). For example, the control unit 210 may determine, based on the LUT, the target frequency to which to tune the selected one of the first PLL/VCO 320 and the second PLL/VCO 330 in order for the mobile communication device 110 to transmit data in accordance with the upcoming RB allocation. In various embodiments, the LUT may provide correlations between one or more RB allocations (e.g., in each frequency band) and target frequencies to which to tune each of a plurality of PLL/VCOs including, for example, but not limited to, the first PLL/VCO 320 and/or the second PLL/VCO 330.

Alternately, if the bandwidth of the upcoming RB allocation is not narrow (i.e., number of allocated RBs greater than x, where x may be equal to 6 or another integer value), the control unit 210 may tune the selected one of the first PLL/VCO 320 and the second PLL/VCO 330 to a frequency corresponding to an assigned channel (e.g., center frequency of assigned E-UTRA Absolute Radio Frequency Channel Number (EARFCN)).

The control unit 210 may perform course tuning (CT) calibration on the selected one of the first PLL/VCO 320 and the second PLL/VCO 330 in order to achieve the target frequency (e.g., frequency corresponding to allocated RBs or to assigned EARFCN). In some embodiments, the control unit 210 may perform CT calibration on the selected one of the first PLL/VCO 320 and the second PLL/VCO 330, and allow the selected one of the first PLL/VCO 320 and the second PLL/VCO 330 to settle to the target frequency. Alternately, in some embodiments, the control unit 210 may perform CT calibration on the selected one of the first PLL/VCO 320 and the second PLL/VCO 330, and perform two point modulation (TPM) to achieve the target frequency.

The PLL selector 340 may be configured to receive one or more control signals from the control unit 210. According to one exemplary embodiment, the PLL selector 340 may select a frequency divided signal generated by the first PLL/VCO 320 and the first divider 325 or by the second PLL/VCO 330 and by the second divider 335 to output to the transmit path 300 based on the one or more control signals from the control unit 210. The control unit 210 may be configured to cause the PLL selector 340 to perform the switch while a first symbol (i.e., symbol #0) is transmitted by the mobile communication device 110 according to the upcoming RB allocation. Additionally, the switch may be performed during a transmission of a cyclic prefix (CP) of a symbol (e.g., symbol #0).

The transmit path 300 may include a digital to analog converter (DAC) 302 configured to receive a digital signal from the control unit 210 and convert the digital signal into an analog signal.

The transmit path 300 may further include a baseband filter (BBF) 304. The BBF 304 may be configured to receive the analog signal from the DAC 302. The BBF 304 may be further configured to receive one or more control signals from the control unit 210. Based on the one or more control signals from the control unit 210, the BBF 304 may be configured to modify a bandwidth of the analog signal received from the DAC 302 to produce a baseband signal (i.e., a filtered analog signal).

The transmit path 300 may include a mixer 306. The mixer 306 may be configured to modulate the frequency divided signal from the PLL selector 340 with the baseband signal from the BBF 304 to generate an up-converted signal. In some embodiments, when the bandwidth of RB allocation is narrow (i.e., number of allocated RBs less or equal to x), the frequency divided signal from the PLL selector 340 may be at a frequency corresponding to the upcoming RB allocation (e.g., center frequency of upcoming RB allocation).

Alternately, when the bandwidth of the RB allocation is not narrow (i.e., number of allocated RBs greater than x), the frequency divided signal from the PLL selector 340 may correspond to the assigned channel (e.g., center frequency of assigned EARFCN). The up-converted signal may have a frequency corresponding to the upcoming RB allocation (e.g., center frequency of upcoming RB allocation).

In various embodiments, the BBF 304 may be configured to produce a baseband signal based on a required frequency of the RB allocation and a tuned frequency of the frequency divided signal received at the transmit path 300 (e.g., from the PLL selector 340). For example, the frequency of the baseband signal generated by the BBF 304 may be adjusted such that modulating the baseband signal with the frequency divided signal generates an up-converted signal at the required frequency of the upcoming RB allocation (e.g., center frequency of upcoming RB allocation).

The transmit path 300 may further include an amplifier (amp) 308. The amp 308 may be configured to amplify the up-converted signal from the mixer 306 for transmission.

The antenna 234 may receive the amplified signal from the amp 308 and transmit the amplified signal. For example, an amplified signal from the amp 308 may be transmitted to the communication network 120 (e.g., the first eNodeB 122 or the second eNodeB 124) on the subscription 115 via the antenna 234.

A person having ordinary skill in the art can appreciate that the RF module 232 may include additional and/or different components than shown in FIG. 3A without departing from the scope of the present disclosure. For example, although not shown, a person having ordinary skill in the art can appreciate that the RF module 232 may additionally include a receive path without departing from the scope of the present disclosure.

Figure 3B:
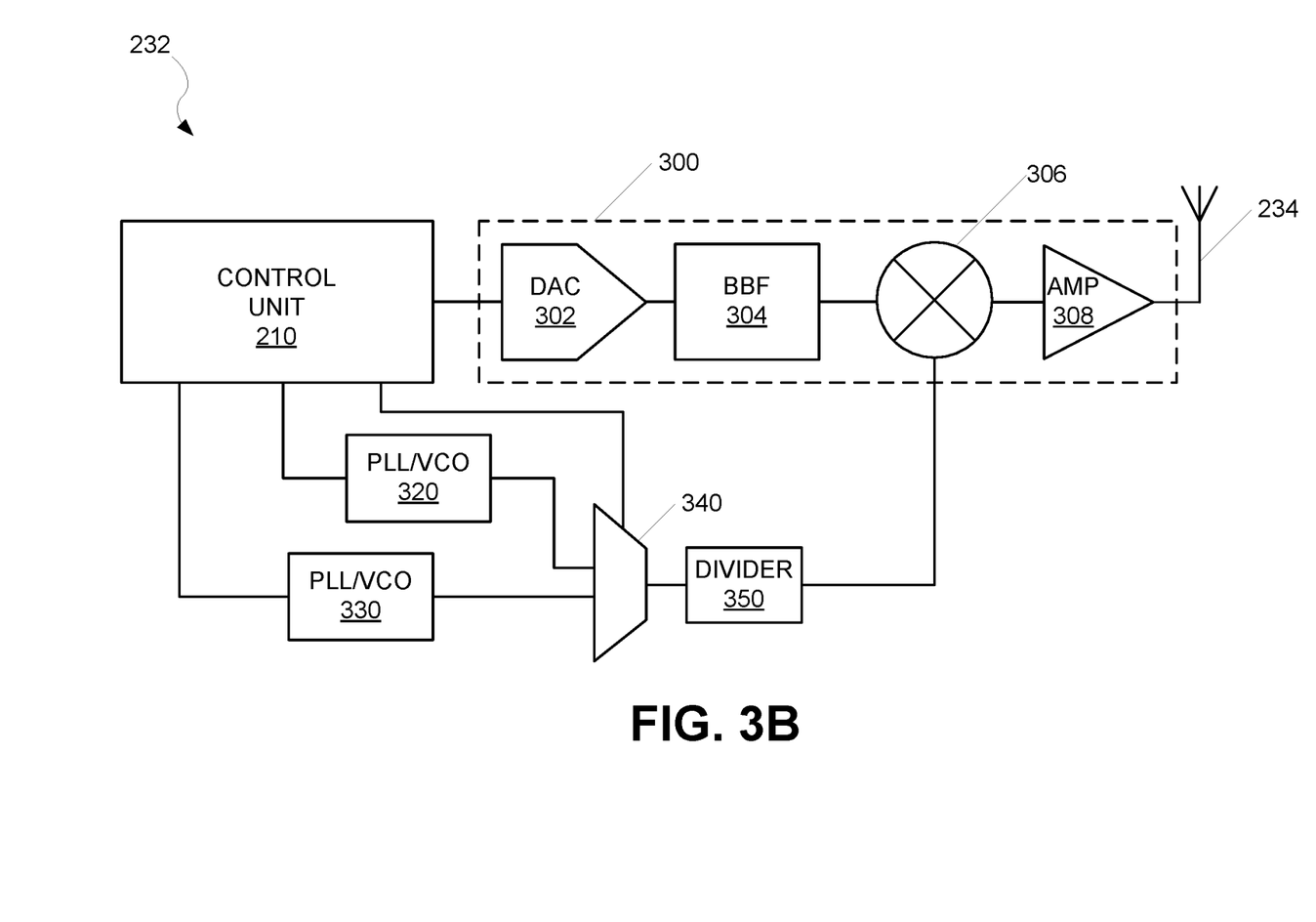
FIG. 3B is a block diagram illustrating an RF module according to some embodiments.

FIG. 3B is a block diagram illustrating an embodiment of the RF module 232 according to some embodiments. Referring to FIGS. 1, 2, and 3A-3B, the RF module 232 may include the transmit path 300 and the PLL selector 340. The transmit path 300 may include the DAC 302, the BBF 304, the mixer 306, and the amp 308.

The RF module 232 may include a third divider 350. In some embodiments, the third divider 350 may be shared amongst a plurality of PLL/VCOs including, for example, but not limited to, the first PLL/VCO 320 and the second PLL/VCO 330. According to one exemplary embodiment, the third divider 350 may be shared between two PLL/VCOs (e.g., the first PLL/VCO 320 and the second PLL/VCO 330). However, a person having ordinary skill in the art can appreciate that the RF module 232 can include a different combination of PLL/VCOs and dividers without departing from the scope of the present disclosure.

In various embodiments, the control unit 210 may select and tune one of the first PLL/VCO 320 and the second PLL/VCO 330 in response to receiving an upcoming RB allocation that is different from a current RB allocation. For example, one of the first PLL/VCO 320 and the second PLL/VCO 330 may be in use to transmit data according to the current RB allocation. As such, the control unit 210 may select and tune the other of the first PLL/VCO 320 and the second PLL/VCO 330 that is not currently in use to a target frequency based on a bandwidth of the upcoming RB allocation (i.e., number of allocated RBs).

The control unit 210 may tune the selected one of the first PLL/VCO 320 and the second PLL/VCO 330 to a frequency corresponding to allocated RBs if the bandwidth of the upcoming RB allocation is narrow (i.e., number of allocated RBs less than or equal to a threshold x). Alternately, the control unit 210 may tune the selected one of the first PLL/VCO 320 and the second PLL/VCO 330 to a frequency corresponding to the assigned channel (e.g., center frequency of assigned EARFCN) if the bandwidth of the upcoming RB allocation is not narrow (i.e., number of allocated RBs greater than x). Moreover, the control unit 210 may cause the PLL selector 340 to switch to the output signal from the selected one of the first PLL/VCO 320 and the second PLL/VCO 330 (e.g., during a CP of symbol #0).

In some embodiments, the PLL selector 340 may be configured to receive one or more control signals from the control unit 210. Based on the one or more control signals from the control unit 210, the PLL selector 340 may select a voltage controlled signal directly from one of the first PLL/VCO 320 and the second PLL/VCO 330. The PLL selector 340 may further output the voltage controlled signal from the selected one of the first PLL/VCO 320 and the second PLL/VCO 330 to the third divider 350. The third divider 350 may output a frequency divided signal to the transmit path 300, where the frequency divided signal is modulated with a baseband signal (e.g., at an appropriate frequency) from the BBF 304 by the mixer 306 and amplified by the amp 308 for transmission using the antenna 234.

A person having ordinary skill in the art can appreciate that the RF module 232 may include additional and/or different components than shown in FIG. 3B without departing from the scope of the present disclosure. For example, although not shown, a person having ordinary skill in the art can appreciate that the RF module 232 may additionally include a receive path without departing from the scope of the present disclosure.

Figure 4:
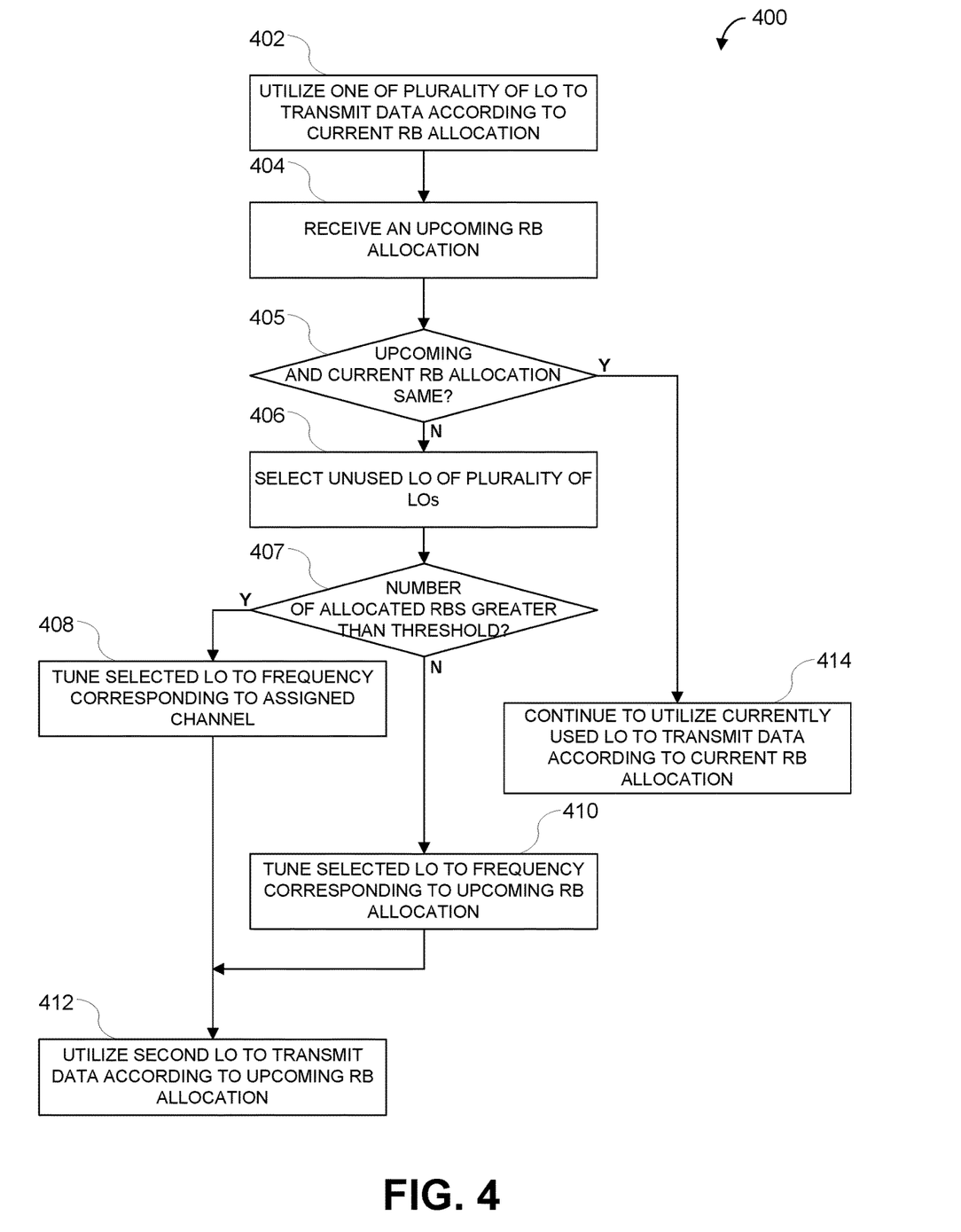
FIG. 4 is a flowchart illustrating a process for frequency hopping uplink transmission according to various embodiments.

FIG. 4 is a flowchart illustrating a process 400 for frequency hopping uplink transmission according to various embodiments. Referring to FIGS. 1-4, the process 400 may be performed by the control unit 210.

The control unit 210 may utilize one of a plurality of LOs to transmit data according to a current RB allocation (402). For example, the control unit 210 may have tuned the first PLL/VCO 320 to generate a signal at a frequency corresponding to the current RB allocation. As such, the first PLL/VCO 320 may be generating a voltage controlled signal at a frequency corresponding to the current RB allocation (e.g., center frequency of current RB allocation) or at a frequency corresponding to the assigned channel (e.g., center frequency of assigned EARFCN). According to one exemplary embodiment, the control unit 210 may also have transmitted one or more control signals to the PLL selector 340 causing the PLL selector 340 to switch to the voltage controlled signal output by the first PLL/VCO 320 and not another of the plurality of PLL/VCOs (e.g., the second PLL/VCO 330).

The control unit 210 may receive an upcoming RB allocation (404). For example, the control unit 210 may receive an upcoming RB allocation for the mobile communication device 110 from the communication network 120 (e.g., via the first eNodeB 122 or the second eNodeB 124) on the PDCCH in advance (e.g., 4-8 slot periods).

The control unit 210 may determine whether the upcoming RB allocation is the same as the current RB allocation (405). For example, the control unit 210 may compare the current and upcoming RB allocation to determine whether a bandwidth and/or frequency range of the upcoming RB allocation is different from a bandwidth and/or frequency range of the current RB allocation.

If the control unit 210 determines that the upcoming RB allocation is the same as the current RB allocation (405—Y), the control unit 210 may continue to utilize the currently used LO to transmit data according to the current RB allocation (414). For example, if the bandwidth and/or frequency range of the upcoming RB allocation is the same as the bandwidth and/or frequency range of the current RB allocation, the control unit 210 may continue to utilize the first PLL/VCO 320 to generate a voltage controlled signal at a frequency corresponding to the current RB allocation or at a frequency corresponding to the assigned channel (e.g., center frequency of assigned EARFCN).

If the control unit 210 determines that the upcoming RB allocation is not the same (i.e., different) as the current RB allocation (405—N), the control unit 210 may select an unused LO of the plurality of LO (406). For example, if the control unit 210 determines that the upcoming RB allocation has a different bandwidth and/or frequency range than the current RB allocation, the control unit 210 may select the second PLL/VCO 330, which is not currently being used to transmit data according to the current RB allocation.

The control unit 210 may determine whether a number of allocated RBs associated with the upcoming RB allocation is greater than a threshold (407). For example, the control unit 210 may determine whether a bandwidth of the upcoming RB allocation is narrow (i.e., upcoming number of allocated RBs equal to or less than the threshold) or not narrow (i.e., upcoming number of allocated RBs greater than the threshold).

If the control unit 210 determines that the number of allocated RBs associated with the upcoming RB allocation is greater than the threshold (407—Y), the control unit 210 may tune the second LO to a frequency corresponding to an assigned channel (408). For example, if the control unit 210 determines that the upcoming RB allocation is not narrow (i.e., upcoming number of allocated RBs greater than the threshold), the control unit 210 may tune the second PLL/VCO 330 to a center frequency of the assigned channel (e.g., EARFCN).

In some embodiments, tuning the second LO (e.g., the second PLL/VCO 330) may include performing CT calibration and allowing the second LO (e.g., the second PLL/VCO 330) to settle to the frequency corresponding to the assigned channel. In other embodiments, the control unit 210 may tune the second LO (e.g., the second PLL/VCO 330) by performing CT calibration and TPM.

Alternately, the control unit 210 may determine that the upcoming number of allocated RBs is not greater than the threshold (407—N). As such, the control unit 210 may tune the second LO to a frequency corresponding to the upcoming RB allocation (410). For example, if the control unit 210 determines that the upcoming RB allocation is narrow (i.e., upcoming number of allocated RBs less than or equal to the threshold), the control unit 210 may tune the second LO to a center frequency of the upcoming RB allocation.

In one exemplary embodiment, the control unit 210 may determine the frequency corresponding to the upcoming RB allocation based on an LUT. For example, the control unit 210 may determine, based on the LUT, a target frequency to which to tune the second LO in order for the mobile communication device 110 to transmit data in accordance with the upcoming RB allocation. In various embodiments, the LUT may provide correlations between one or more RB allocations (e.g., in each frequency band) and frequencies to which to tune each of a plurality of PLL/VCOs including, for example, but not limited to, the first PLL/VCO 320 and the second PLL/VCO 330.

In some embodiments, tuning the second LO (e.g., the second PLL/VCO 330) may include performing CT calibration and allowing the second LO (e.g., the second PLL/VCO 330) to settle to the frequency corresponding to the assigned channel. In other embodiments, the control unit 210 may tune the second LO (e.g., the second PLL/VCO 330) by performing CT calibration and TPM.

The control unit 210 may utilize the second LO to transmit data according to the upcoming RB allocation (412). For example, in one embodiment, the first PLL/VCO 320 and the second PLL/VCO 330 may each be coupled with a corresponding divider (e.g., the first divider 325 and the second divider 335). As such, the control unit 210 may transmit one or more signals to the PLL selector 340 that cause the PLL selector 340 to switch from the frequency divided signal output by the first divider 325 to the frequency divided signal output by the second divider 335.

Alternately, in other embodiments, the first PLL/VCO 320 and the second PLL/VCO 330 may share a single divider (e.g., the third divider 350). As such, the control unit 210 may transmit one or more control signals to the PLL selector 340 causing the PLL selector 340 to switch from the voltage controlled signal output by the first PLL/VCO 320 to the voltage controlled signal output by the second PLL/VCO 330.

According to one exemplary embodiment, the control unit 210 may cause the PLL selector 340 to perform the switch while a first symbol (i.e., symbol #0) is transmitted by the mobile communication device 110 according to the upcoming RB allocation. The switch may be further performed during a transmission of the CP of a symbol (e.g., symbol #0).

The accompanying claims and their equivalents are intended to cover such forms or modifications as would fall within the scope and spirit of the protection. For example, the example apparatuses, methods, and systems disclosed herein may be applied to multi-SIM wireless devices subscribing to multiple communication networks and/or communication technologies. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the method must be performed in the order presented. Certain of the operations may be performed in various orders. Words such as "thereafter," "then," "next," etc., are not intended to limit the order of the operations; these words are simply used to guide the reader through the description of the methods.

The various illustrative logical blocks, modules, circuits, and operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read-only memory (ROM), electrically erasable programmable read-only memory (EEPROM), FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An apparatus for frequency hopping uplink transmission, comprising:
   a transmit path;
   a plurality of local oscillators (LO); and
   a control unit configured to:
      receive an upcoming resource block (RB) allocation;
      determine whether the upcoming RB allocation is the same as a current RB allocation; and
      in response to determining that the upcoming RB allocation is different than the current RB allocation:
         select an unused LO of the plurality of LOs;
         determine whether a number of allocated RBs associated with the upcoming RB allocation is greater than a threshold; and
         in response to determining that the number of allocated RBs associated with the upcoming RB allocation is not greater than the threshold, tune the selected LO to a frequency corresponding to the upcoming RB allocation.

2. The apparatus of claim 1, wherein the control unit is further configured to provide an output signal from the selected LO to transmit data via the transmit path according to the upcoming RB allocation.

3. The apparatus of claim 2, further comprising a phase locked loop (PLL) selector configured to receive one or more control signals from the control unit;
   wherein each of the plurality of LOs comprise a PLL and a corresponding voltage controlled oscillator (VCO) (PLL/VCO).

4. The apparatus of claim 3, wherein a first PLL/VCO of the plurality of PLL/VCOs is coupled with a first divider and a second PLL/VCO of the plurality of PLL/VCOs is coupled with a second divider, and wherein the PLL selector is further configured to switch from a first output signal of the first divider to a second output signal of the second divider to provide the second output signal to the transmit path based at least in part on the one or more control signals from the control unit.

5. The apparatus of claim 4, wherein the control unit is further configured to cause the switch to be performed while a first symbol is transmitted via the transmit path according to the upcoming RB allocation.

6. The apparatus of claim 4, wherein the control unit is further configured to cause the switch to be performed during a transmission of a cyclic prefix (CP).

7. The apparatus of claim 3, wherein a first PLL/VCO of the plurality of PLL/VCOs and a second PLL/VCO of the plurality of PLL/VCOs are coupled with a shared divider, and wherein the PLL selector is configured to switch from an output signal of the first PLL/VCO to the output signal of the second PLL/VCO to provide the output signal of the second PLL/VCO to the shared divider based at least in part on the one or more control signals from the control unit.

8. The apparatus of claim 7, wherein the control unit is further configured to cause the switch to be performed while a first symbol is transmitted via the transmit path according to the upcoming RB allocation.

9. The apparatus of claim 7, wherein the control unit is further configured to cause the switch to be performed during a transmission of a cyclic prefix (CP).

10. The apparatus of claim 1, wherein the transmit path comprises a baseband filter (BBF) and a mixer.

11. The apparatus of claim 10, wherein the BBF is configured to generate a baseband signal based on a tuned frequency of the selected LO and a required frequency of the upcoming RB allocation, and wherein the mixer is configured to modulate a signal at the tuned frequency of the selected LO with the baseband signal from the BBF.

12. The apparatus of claim 1, wherein the control unit is further configured to:
   in response to determining that the number of allocated RBs associated with the upcoming RB allocation is greater than the threshold, tune the selected LO to a frequency corresponding to an assigned channel.

13. The apparatus of claim 12, wherein the frequency corresponding to the assigned channel comprises a center frequency of the assigned channel.

14. The apparatus of claim 1, wherein the control unit is further configured to:
in response to determining that the upcoming RB allocation is the same as the current RB allocation, continue to utilize a currently used LO to transmit data according to the current RB allocation.

15. The apparatus of claim 1, wherein the control unit is further configured to tune the selected LO at least in part by performing coarse tuning (CT) calibration and allowing the selected LO to settle to the frequency corresponding to the upcoming RB allocation.

16. The apparatus of claim 1, wherein the control unit is further configured to tune the selected LO at least in part by performing coarse tuning (CT) calibration and two-point modulation (TPM).

17. An apparatus for frequency hopping uplink transmission, comprising:
means for providing an output signal from a plurality of local oscillators (LO); and
control means for receiving an upcoming resource block (RB) allocation and for determining whether the upcoming RB allocation is the same as a current RB allocation;
the control means in response to determining that the upcoming RB allocation is different than the current RB allocation:
selects an unused LO of the plurality of LOs;
determines whether a number of allocated RBs associated with the upcoming RB allocation is greater than a threshold; and
in response to determining that the number of allocated RBs associated with the upcoming RB allocation is not greater than the threshold, tunes the selected LO to a frequency corresponding to the upcoming RB allocation.

18. A non-transitory computer readable medium having stored thereon instructions for causing one or more processors to perform operations comprising:
receiving an upcoming resource block (RB) allocation;
determining whether the upcoming RB allocation is the same as a current RB allocation; and
in response to determining that the upcoming RB allocation is different than the current RB allocation:
selecting an unused local oscillator (LO) of a plurality of LOs not currently in use;
determining whether a number of allocated RBs associated with the upcoming RB allocation is greater than a threshold; and
in response to determining that the number of allocated RBs associated with the upcoming RB allocation is not greater than the threshold, tuning the selected LO to a frequency corresponding to the upcoming RB allocation.

* * * * *